United States Patent
Blatter et al.

[11] Patent Number: 5,933,500
[45] Date of Patent: Aug. 3, 1999

[54] ADAPTIVE DECODING SYSTEM FOR PROCESSING ENCRYPTED AND NON-ENCRYPTED BROADCAST, CABLE OR SATELLITE VIDEO DATA

[75] Inventors: Harold Blatter; Thomas Edward Horlander; Kevin Elliott Bridgewater, all of Indianapolis; Michael Scott Deiss, Zionsville, all of Ind.

[73] Assignee: Thomson Consumer Electronics, Inc., Indianapolis, Ind.

[21] Appl. No.: 08/761,517

[22] Filed: Nov. 27, 1996

Related U.S. Application Data

[60] Provisional application No. 60/018,722, May 31, 1996, abandoned.

[51] Int. Cl.$^6$ ...................................................... H04N 7/16
[52] U.S. Cl. ............................................ 380/20; 380/16
[58] Field of Search ........................................ 380/20, 16

[56] References Cited

U.S. PATENT DOCUMENTS

| | | | |
|---|---|---|---|
| 4,790,010 | 12/1988 | Sgrignoli | 380/10 |
| 4,907,273 | 3/1990 | Wiedemer | 380/16 |
| 4,945,563 | 7/1990 | Horton et al. | 380/5 |

FOREIGN PATENT DOCUMENTS

| | | | |
|---|---|---|---|
| 649 261 A2 | 4/1995 | European Pat. Off. | H04N 7/24 |
| WO96/06504 | 2/1996 | WIPO | H04N 7/167 |

OTHER PUBLICATIONS

U. Reimers, *Digitale Fernsehtechnik*, 1995, pp.9–11 and 171–176, Germany (translation attached).
*Functional Model of a Conditional Access System*, EBU Review Technical, Grand–Saconnex, CH, Dec. 21, 1995, pp. 64–77.
*MPEG Systems Standard* (ISO/IEC 13818-1, Jun. 10th 1994, Sections 2.4 and 2.6.
Preliminary EIA Document of Apr. 7 1994 version 2.0 draft as precursor to unpublished EIA Draft Document IS–679, Project PN–3639 by NRSS (National Renewable Standards Committee).
International Standards Organization Document ISO 7816-3 of 1989.

*Primary Examiner*—Gilberto Barron, Jr.
*Attorney, Agent, or Firm*—Joseph S. Tripoli; Ronald H. Kurdyla; Alexander J. Burke

[57] ABSTRACT

An adaptive decoder generates a program representative datastream, in selectable, encrypted or decrypted form. A method for adaptively processing input encrypted program data with an associated encryption code provides either an encrypted or a decrypted program output. In an encrypted mode, encrypted program data and an associated encryption code is exported to an output port. In a decrypted mode, input encrypted program data is decrypted using an encryption key derived from the encryption code to provide decrypted program data. The decrypted program data is exported to the output port. Non-encrypted program data is exported to an output port in a selectable non-encrypted mode.

20 Claims, 4 Drawing Sheets

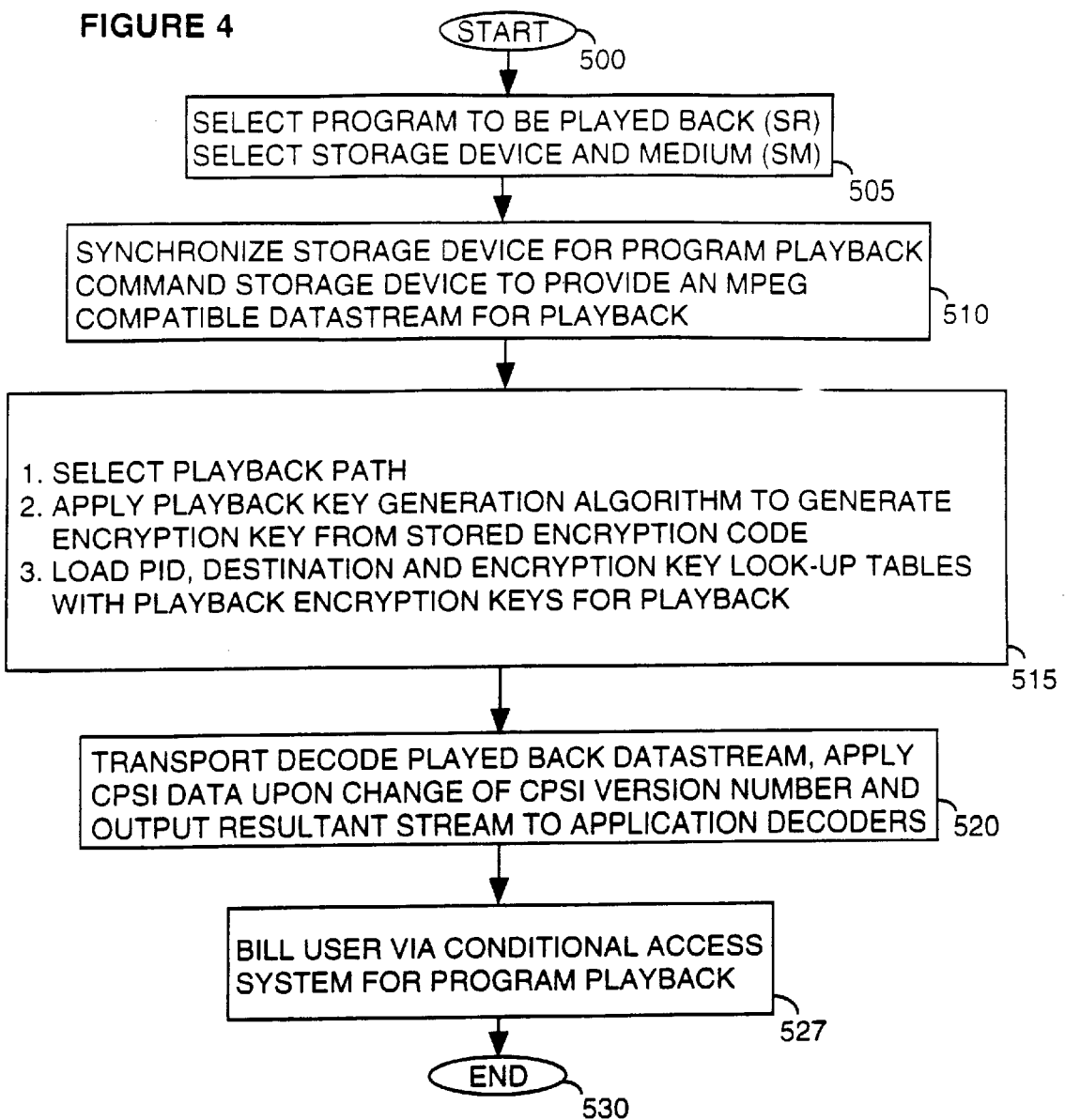

5,933,500

ADAPTIVE DECODING SYSTEM FOR PROCESSING ENCRYPTED AND NON-ENCRYPTED BROADCAST, CABLE OR SATELLITE VIDEO DATA

This is a non-provisional application of provisional application Ser. No. 60/018,722 by H. Blatter et al, filed May 31, 1996, abandoned.

FIELD OF THE INVENTION

This invention is related to the field of digital signal processing, and more particularly to the conditional access processing, decoding, and formatting of encrypted packet data for storage by a consumer receiver of broadcast, satellite or cable video material, for example.

BACKGROUND OF THE INVENTION

In video processing and storage applications, digital video data is typically encoded to conform to the requirements of a known standard. One such widely adopted standard is the MPEG2 (Moving Pictures Expert Group) image encoding standard, hereinafter referred to as the "MPEG standard". The MPEG standard is comprised of a system encoding section (ISO/IEC 13818-1, Jun. 10, 1994) and a video encoding section (ISO/IEC 13818-2, Jan. 20, 1995, hereinafter referred to as the "MPEG systems standard" and "MPEG video standard" respectively. Video data encoded to the MPEG standard is in the form of a packetized datastream which typically includes the data content of many program channels (analogous to channels 1–125 in cable TV, for example). The data content of premium program channels such as HBO™, Cinemax™ and Showtime™, for example, is usually protected from unauthorized access by methods such as encryption and scrambling. These methods may be used alone, repetitively, or in combination to provide a plurality of levels of protection.

In a decoder, access to the premium channels is typically governed by a conditional access system which manages user billing and controls program descrambling and decryption based on user entitlement. The conditional access system may determine whether access is authorized in a variety of ways. For example, authorization may be determined within the decoder from user entitlement information pre-programmed on a so-called "smart card". Alternatively, authorization may be determined at a remote location and implemented within the decoder using user entitlement information that is transmitted from the remote location, as in a cable television pay-per-view service. The entitlement information typically includes codes used to generate descrambling and decryption keys that are used for program descrambling and decryption. However, the entitlement information may instead include the keys themselves.

The processing of encrypted and non-encrypted program data and the management of associated encryption and scrambling codes for storage, billing and other applications presents a number of problems. One problem is presented by the need to maintain encryption code security when a program is stored by a consumer in either encrypted or non-encrypted form for viewing at a later time. Further problems are involved in providing a system that permits billing on the storage or playback of a program and that permits copy protected processing of encrypted and non-encrypted program data.

These problems are addressed by a system according to the present invention. Hereinafter the term "encryption" encompasses scrambling functions to the extent that the functions are used to prevent unauthorized use.

SUMMARY OF THE INVENTION

Service providers and video receiver Users may desire the capability of determining whether a program broadcast by a service provider is stored in either encrypted or decrypted form. A service provider, given this capability, is able to structure billing so as to charge Users for storage of premium programs e.g. HBO™ movies, based on permitted subsequent program use. For example, such a system allows a service provider to charge one fee for storing a program in decrypted form with unlimited use and other fees for storing a program in encrypted form with limited use. Such a limited use may fix the maximum number of times a stored encrypted program may be re-played or copied Billing for the program storage may be structured proportionately with the allowed use. Once a program has been stored in encrypted form, a service provider may control access to the encrypted program and copying of the encrypted program via pre-stored smart card entitlement information.

A User may desire the capability of selecting between encrypted or decrypted program storage for a variety of reasons. For example, a User may wish to take advantage of usage structured billing and elect reduced cost, limited use, encrypted program storage in preference to more expensive, unlimited use, decrypted program storage. Alternatively, a User may wish to select encrypted storage of adult-rated program material to prevent access by children, for example. The inventors have hereby recognized that it is desirable to provide an adaptive decoder capable of generating a program representative datastream, in selectable, encrypted or decrypted form for storage, transmission or other applications.

In accordance with the principles of the present invention, an adaptive decoder generates a program representative datastream, in selectable, encrypted or decrypted form. A method for adaptively processing input encrypted program data with an associated encryption code provides either an encrypted or a decrypted program output. In an encrypted mode, encrypted program data and an associated encryption code is exported to an output port. In a decrypted mode, input encrypted program data is decrypted using an encryption key derived from the encryption code to provide decrypted program data. The decrypted program data is exported to the output port.

In a feature of the invention, non-encrypted program data is exported to an output port in a selectable non-encrypted mode.

BRIEF DESCRIPTION OF THE DRAWINGS

In the drawing:

FIG. 4 shows a flowchart for a process for recovering selected encrypted or non-encrypted programs from a selected storage device and for billing a user upon program recovery.

DETAILED DESCRIPTION OF THE DRAWINGS

Figure 1:
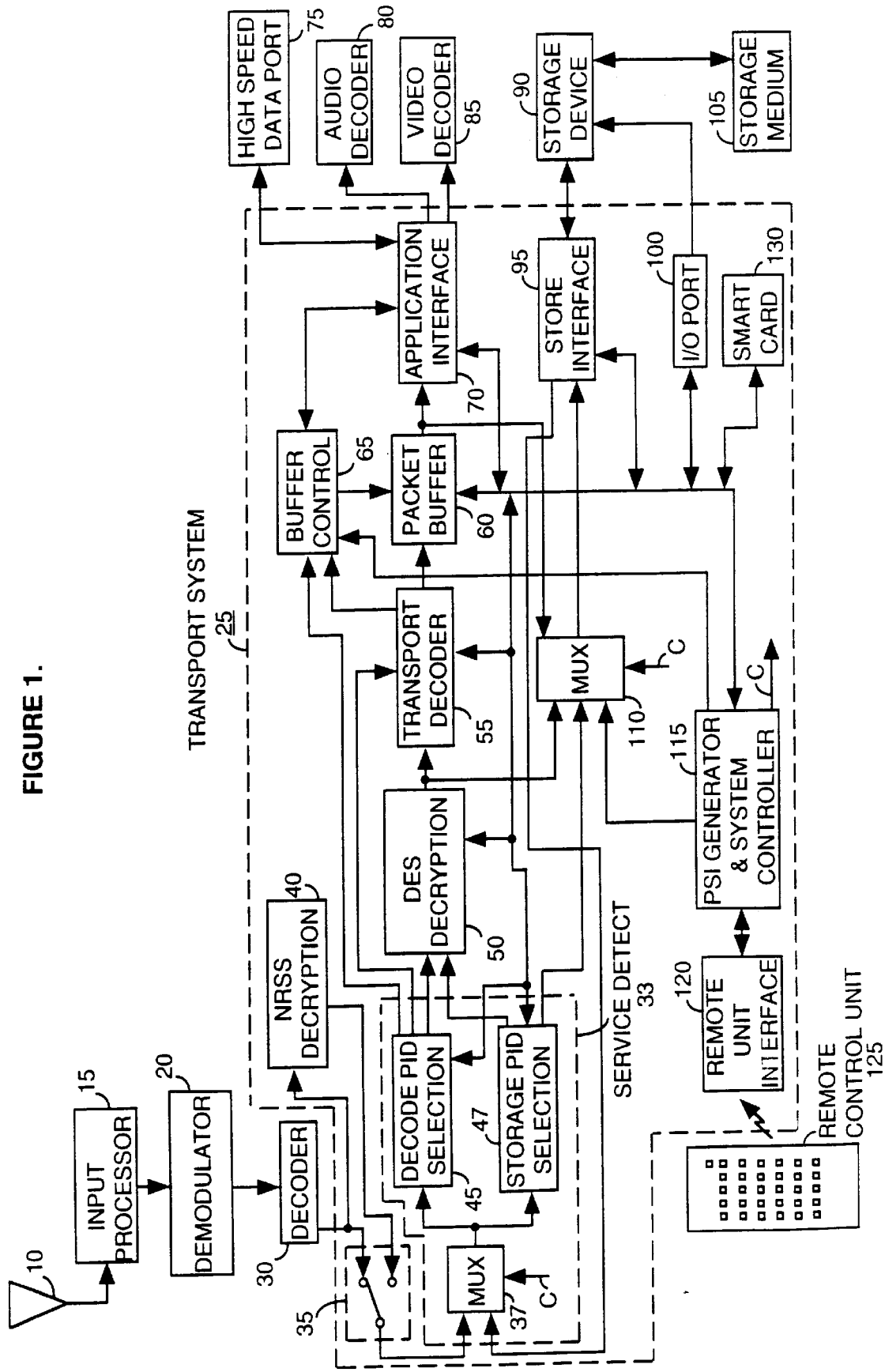
FIG. 1 shows a video receiver system, according to the invention, for adaptively generating a program representative datastream in user selectable, encrypted or non-encrypted form.

FIG. 1 shows a video receiver system, according to the invention, for adaptively generating a program representative datastream, in user selectable, encrypted or non-encrypted form. Although the disclosed system is described in the context of an MPEG compatible system for receiving MPEG encoded transport streams representing broadcast programs, it is exemplary only. The principles of the invention may also be applied to other types of system including non-MPEG compatible systems, involving other types of encoded datastreams. Further, although the disclosed system is described as processing broadcast programs, this is exemplary only. The term 'program' is used to represent any form of packetized data such as telephone messages, computer programs, Internet data or other communications, for example.

In overview, in the video receiver system of FIG. 1, a carrier modulated with video data is received by antenna 10 and processed by unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices. System 25 incorporates a conditional access system for managing user billing and for controlling program descrambling and decryption based on user entitlement. A video receiver user selects the program he wishes to view, the programs he wishes to store, the type of storage media used and whether the programs are to be stored in encrypted or non-encrypted form by on-screen menu selection using remote control unit 125. System 25 also provides a mechanism for permitting real time or non-real time removal of encryption codes from a non-encrypted program datastream.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode, also supports retrieval of the compressed data from storage medium 105 for processing by system 25 for decoding, communication to other devices or storage on a different storage medium (not shown to simplify drawing). The conditional access system within system 25 supports the decryption and billing for program storage, playback, or further processing including communication to other devices. The conditional access system of system 25 employs a different decryption and billing mechanism for processing program data received from a broadcast source than from data played back from a local storage source.

Considering FIG. 1 in detail, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by NRSS (National Renewable Standards Committee) descrambling unit 40. Selector 35 detects the presence of an insertable, NRSS compatible, descrambling card and provides the output of unit 40 to mux 37 only if the card is currently inserted in the video receiver unit (the NRSS removable conditional access system is defined in EIA Draft Document IS-679, Project PN-3639). Otherwise selector 35 provides the output from decoder 30 to mux 37. The presence of the insertable card permits unit 40 to descramble additional premium program channels, for example, and provide additional program services to a viewer. It should be noted that NRSS unit 40 and smart card unit 130 (smart card unit 130 is discussed later) share the same system 25 interface such that only either an NRSS card or a smart card may be inserted at any one time. Alternatively, the interfaces may be separate to allow series or parallel operation.

The data provided to mux 37 from selector 35 is in the form of an MPEG compliant packetized transport datastream as defined in MPEG systems standard section 2.4 and includes the data content of one or more program channels. The individual packets that comprise particular program channels are identified by Packet Identifiers (PIDs). The transport stream contains ancillary data supporting transmission and decoding of transport encoded data. The ancillary data includes Program Specific Information (PSI) for use in identifying the PIDs and assembling individual data packets to recover the content of all the program channels that comprise the packetized datastream. A video receiver user selects the program he wishes to view, the programs he wishes to store, the media to be used for storage and whether the programs are to be stored in encrypted or non-encrypted form by on-screen menu selection using remote control unit 125. System controller 115 uses the selection information, provided via interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C. Controller 115 is also programmable to permit real time and non-real time removal of encryption codes from a non-encrypted program datastream that is to be stored or otherwise processed. This feature enhances encryption security by preventing the export of encryption keys beyond system 25 thereby limiting availability to third parties.

In response to control signal C, mux 37 selects either the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115.

The encryption keys are generated by ISO 7816-3 compliant smart card system 130 from encryption codes extracted from the input datastream. The generation of the encryption keys is subject to customer entitlement determined from coded information pre-stored on the insertable smart card itself (International Standards Organization document ISO 7816-3 of 1989 defines the interface and signal structures for a smart card system). Customer entitlement information may be periodically changed by updating the coded information on the insertable smart card via commands in the input datastream.

The insertable, ISO 7816-3 compliant smart card advantageously contains three algorithm functions. Two of the algorithm functions, termed the broadcast encryption algorithms, are assigned to generate encryption keys from broadcast encryption codes extracted from the input datastream in non-playback modes of system 25. A broadcast encryption algorithm generates encryption keys by decrypting broadcast encryption codes within smart card 130 itself. The third algorithm function is applied in system 25 for encrypting and decrypting the derived broadcast encryption keys in storage and playback modes of system 25. The playback algorithm encrypts and decrypts the broadcast encryption keys within the insertable smart card itself. However, in other systems, the playback algorithm function may reside elsewhere, such as in a decoder, for example.

The three encryption algorithms used in smart card 130 may be any one of a variety of types and the playback algorithm need not be the same type as the broadcast algorithm. For exemplary purposes, the broadcast and playback algorithms are deemed to be Data Encryption Standard (DES) algorithm functions as defined in Federal Information Standards (FIPS) Publications 46, 74 and 81 provided by the National Technical Information Service, Department of Commerce. However, these algorithm functions may alternatively be another type such as Rivest-Shamir-Adlemann (RSA) type functions.

Each of the two broadcast encryption algorithms that are resident on the smart card may be activated by control information in the input datastream. Two broadcast encryption algorithms are contained within the smart card in order to permit a service provider to make a simultaneous change in broadcast encryption algorithm for all customers. A service provider makes a change in broadcast encryption algorithm by issuing a new smart card with a new algorithm to all customers safely in advance of the date the new algorithm is to be employed. On the change date, the service provider simultaneously: commands the smart card to change to the new algorithm by updating the control information in the broadcast datastream; encrypts programs with the new algorithm; and inserts updated encryption codes in the broadcast datastream. A change in algorithm may be implemented by a service provider on a regular basis or as frequently as desired in order to safeguard encryption system security and prevent code-breaking and unauthorized program access.

The inventors have recognized that the use of such an encryption system involving changing encryption keys poses a problem for storage of programs in encrypted form. Specifically, a program stored in encrypted form along with an associated broadcast encryption code may not be able to be decrypted once the smart card has been changed and the smart card algorithms have been updated. This is because the new algorithm on the smart card is not compatible with an encryption code associated with an earlier version smart card. Consequently, the new smart card algorithm is unable to derive the required broadcast encryption key from the stored encryption code. This means that the stored encrypted program cannot be decrypted and is unusable once a system smart card has been changed.

In order to overcome this problem, a third and different algorithm, the playback algorithm, is advantageously incorporated on the smart card. The third algorithm function, termed the playback algorithm, is used in specific operations and modes of system 25 for encrypting broadcast encryption keys to form playback encryption codes in storage and playback modes of system 25.

Once encrypted by the playback algorithm, the playback encryption codes may be securely stored, along with encrypted program content, on a storage medium. Upon playback of the encrypted program, the playback algorithm function decrypts the stored encryption codes to derive the original broadcast encryption keys to enable decryption of the encrypted program content. The derived broadcast encryption keys are used by unit 50 to decrypt encrypted program content packets as described later. The playback algorithm is not changed as frequently as the two broadcast algorithms and may be left unchanged in successive versions of smart card. This enables the stored encrypted program to be decrypted and used despite changes in smart cards and broadcast encryption algorithms.

The packets provided by units 45 and 47 to unit 50 are encrypted according to the Data Encryption Standard (DES). Decryption unit 50 of system 25 of FIG. 1 employs the DES algorithm function in decrypting these encrypted packets. In other implementations of system 25 unit 50 may alternatively use other algorithm functions such as the previously mentioned RSA function. Unit 50 applies known techniques to decrypt the encrypted packets using corresponding encryption keys provided by smart card 130 via units 45 and 47. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains packet buffers accessible by controller 115. One of the buffers is assigned to hold data destined for use by controller 115 and three other buffers are assigned to hold packets that are destined for use by application devices 75, 80 and 85. A further buffer, the substitution buffer discussed later, is used to hold data for substituting for encryption code data. Access to the packets stored in the buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, i.e., a packet containing an adaptation field, decoder 55 signals controller 115 that the packet has been received, by setting a system interrupt within an interrupt mechanism. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of to an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock (not shown to simplify drawing). Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. Data port 75 may be used to provide high speed data such as computer programs, for example to a computer. Alternatively port 75 may be used to output data to an HDTV decoder, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Figure 2:
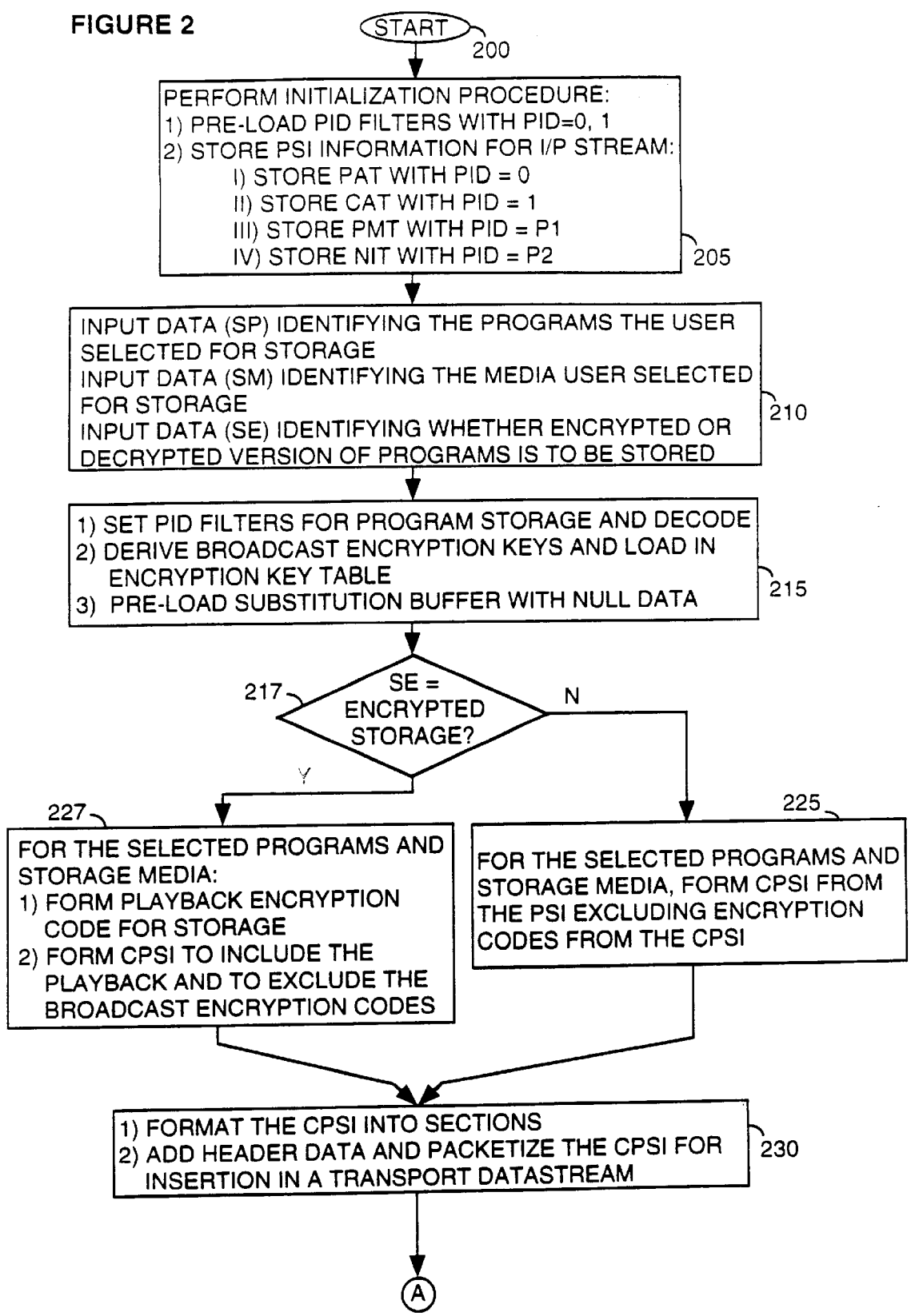
FIGS. 2 and 3 show a process flowchart for providing a program representative datastream suitable for storage on a selectable storage medium and for executing the associated user billing.
Figure 3:
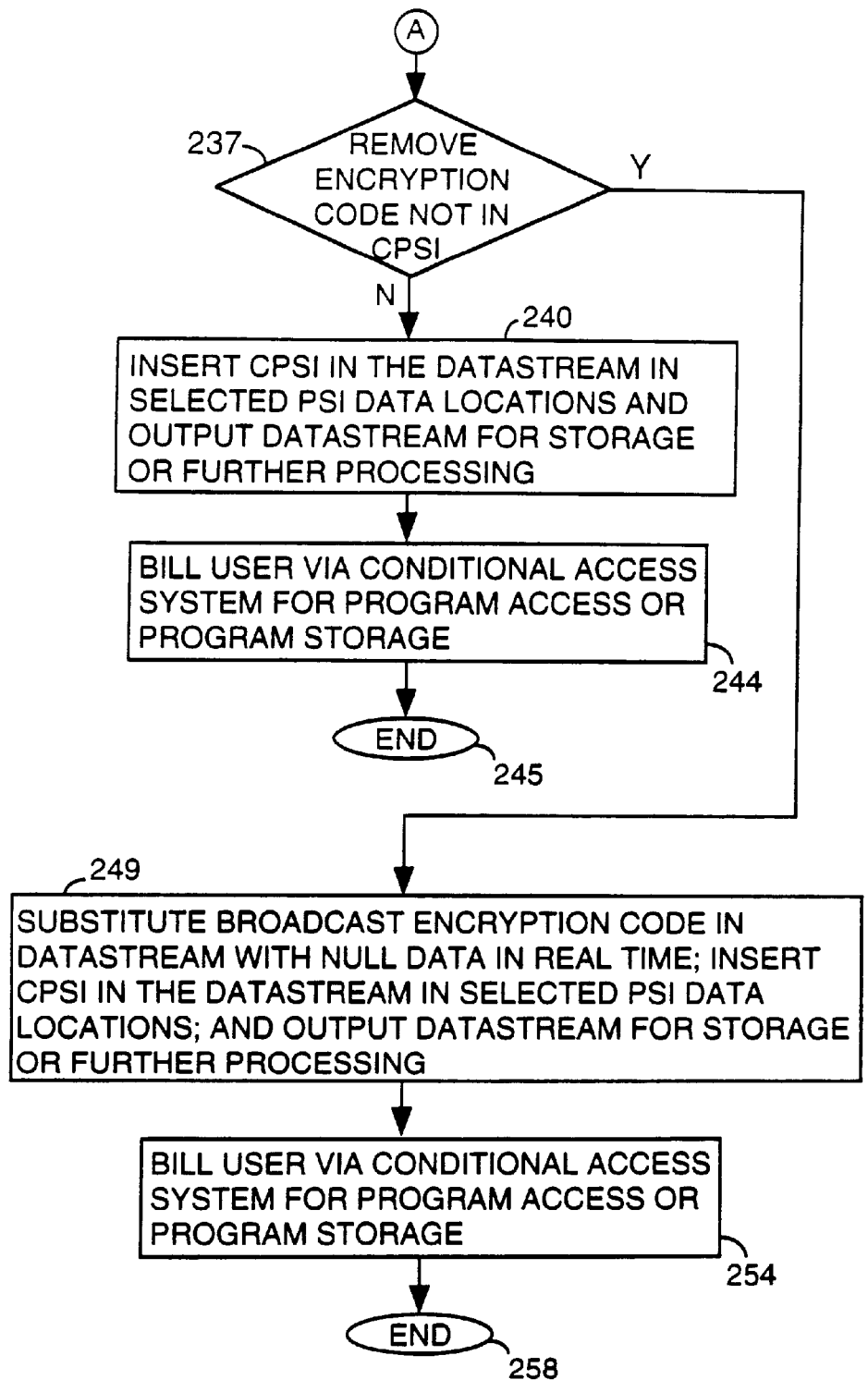

Controller 115 employs the process of FIGS. 2 and 3 to generate a program datastream suitable for storage on medium 105 and to bill a user for the storage. Controller 115 also employs the process of FIGS. 2 and 3 both to generate a playback encryption code for storage on medium 105, and to remove the original broadcast encryption codes from the program datastream to be stored. The packet identification and direction process of FIGS. 2 and 3 is governed by controller 115, control unit 65, and the PID, destination and encryption key look-up tables of units 45 and 47 in the manner previously described.

The CPSI (Condensed Program Specific Information) contains information related to the particular program to be stored, whereas the PSI contains information related to all the programs in the datastream input to system 25. Consequently, the CPSI takes up less storage capacity and imposes less overhead than the PSI. In addition, given a fixed overhead constraint, the CPSI may be repeated in a datastream more frequently than the PSI and so may be derived and applied to reduce the recovery latency of program content.

The PSI as defined in MPEG systems standard section 2.4.4 comprises four non-encrypted elements or tables of information. These are the Program Association Table (PAT), the Program Map Table (PMT), the Network Information Table (NIT) and the Conditional Access Table (CAT). Each table is formed from data packets that are recognized by a particular PID. The PMT defines the PID labels that identify the individual packetized datastreams that constitute a program. These individual streams are termed elementary streams in the MPEG standard. Elementary streams include datastreams such as video, audio for various languages and caption datastreams. The PAT associates a program number with the PIDs that permit identification and assembly of the packets comprising the PMT. The NIT is optional and may be structured and used to define physical network parameters such as satellite transmission channel frequencies and transponder channels, for example. The CAT contains the conditional access information such as encryption codes that govern access to programs that are dependent upon user entitlement.

In step 205 of FIG. 2, controller 115 (FIG. 1) performs an initialization procedure at system power-up following the start at step 200. In step 205, controller 115 loads the unit 45 (FIG. 1) PID detection filters with the MPEG defined PID values for the PAT and CAT tables (PIDs hex value 0000 and hex value 0001 respectively). In addition, controller 115 pre-assigns the PAT and CAT packets to the controller buffer in unit 60 by updating the unit 45 destination table. The PAT and CAT packets detected by unit 45 are steered via decoder 55 to the controller buffer in unit 60 under control of unit 65. In step 205, control unit 65 signals controller 115 via a PSI interrupt that PSI packets are present in unit 60. Controller 115, upon receipt of the PSI interrupt, repetitively accesses the packets stored in its designated unit 60 buffer and stores the complete CAT and PAT data in internal memory. Controller 115 repeats this process to store complete PMT and NIT data in internal memory after determining the PIDs that identify the PMT and NIT packets from the PAT. Controller 115 continuously accesses buffer 60 and captures PSI packets in internal memory upon receipt of PSI interrupts while the receiver is powered on. As a result, controller 115 captures in its internal memory the PAT, PMT, NIT and CAT data that comprises the full PSI of the transport datastream input to system 25.

In step 210 of FIG. 2, user generated data (SP, SM, SE) identifying the programs a user wishes to store, as well as those programs that are to be stored in encrypted form, and the media and device to be used for storage, is input to controller 115 (FIG. 1). A user may select encrypted storage in preference to non-encrypted storage for a variety of reasons. For example, a service provider may make it cheaper to store in encrypted form as a way of limiting the number of subsequent copies a user may make. A service provider may be achieve this by controlling access to the encrypted program via pre-stored smart card entitlement information. The selection data input to controller 115 is entered by a user through on-screen menu selection with remote control unit 125 via interface 120. In step 215, in response to the input selection data (SP), controller 115 derives the PIDs for the selected programs for storage from the stored PSI. The unit 47 detection filters are loaded with the PIDs of the programs to be stored by controller 115. This enables unit 47 to identify the packets comprising the programs selected for storage. In step 215, controller 115 also pre-loads the unit 60 substitution buffer with null data. The null data is to be substituted for broadcast encryption codes occurring in programs broadcast in encrypted form that are selected for storage.

In step 215 of FIG. 2, unit 47 (FIG. 1) provides non-encrypted packets to mux 110 and provides encrypted packets (identified by an encryption indicator in the packet header data) along with associated broadcast encryption keys to decryption unit 50. The broadcast encryption keys are provided to unit 47 by controller 115 in step 215 of FIG. 2, following their generation by smart card 130 (FIG. 1) by decryption of encryption codes obtained from the CAT for the selected programs (SP) in the manner previously described. However, if selection data SE requests encrypted storage, unit 47 passes the encrypted packets to be stored to mux 110. Consequently, in step 215 of FIG. 2, the packets comprising the programs to be stored (SP) are provided to mux 110 either in encrypted or decrypted form in response to selection data SE.

In steps 217–227, controller 115 forms condensed program specific information (CPSI) for the programs selected for storage (SP) from the full program specific information (PSI) captured from the transport datastream input to system 25. If the SE data requests encrypted storage, controller 115 performs step 227 following decision step 217. In step 227, controller 115 applies the playback algorithm function in smart card system 130 to encrypt the broadcast encryption key previously generated (by decryption of a broadcast encryption code) in step 215 to form a playback encryption code for the program to be stored. The CPSI is formed to include the playback encryption code but to exclude the broadcast encryption code originally present in the PSI of the transport datastream input to system 25. Consequently, the datastream formed for the program destined for storage excludes its associated broadcast encryption code. This prevents the compromise in encryption key security that occurs when encryption keys are stored on removable storage media accessible by third parties. Once keys are accessible on a storage media, their security is dependent on the sophistication of available reverse engineering and code-breaking techniques. In this system, multiple levels of security are provided by not storing the broadcast encryption codes from which the broadcast encryption keys are derived and by storing the broadcast encryption keys in encrypted form. Further, even if the keys were deduced for the stored program, it would not provide access to current broadcast programs for which the broadcast encryption algorithm is regularly changed.

If the SE input data does not request encrypted storage, controller 115 performs step 225 following decision step 217. In step 225, controller 115 forms the CPSI of the program destined for storage from the PSI of the transport datastream input to system 25 and excludes encryption codes from the CPSI.

The described encryption system is exemplary only. Alternative encryption mechanisms may convey the broadcast and playback encryption codes in datastream information areas other than the PSI. Other encryption mechanisms may also require the generation and insertion of the encryption codes at different intervals than is involved in the generation of the PSI. If broadcast encryption codes are not conveyed in PSI, substitution of other data for the these codes may be necessary to exclude them from the datastream formed for the program to be stored. Provision for substitution of null data for the broadcast encryption codes at intervals other than those at which the CPSI occurs is discussed later. Specifically, substitution of broadcast encryption codes in real-time i.e. at packet frequency when the codes are conveyed in packet headers, for example, is discussed in connection with steps 237–249.

In step 230, controller 115 forms the CPSI data into sections in accordance with the MPEG syntax (paragraphs 2.4.4.3–2.4.4.11 of the MPEG systems standard). Controller 115, in step 230, also adds header data to the CPSI data sections to format and packetize the CPSI data for insertion into the datastream to be stored. Controller 115 creates the headers in accordance with sections 2.4.3.2 and 2.4.3.3 of the MPEG systems standard from the PSI header data stored in the controller 115 internal memory. However, CPSI section data is different in length relative to corresponding PSI section data. Therefore, new header parameters including the 'continuity count' indicator and 'payload unit start indicator' are created by controller 115 and inserted in the respective indicator fields within the header data. The new continuity count indicator created by controller 115 reflects, for example, the number of packets per PID for the CPSI elements instead of the different number of packets per PID of the corresponding PSI elements. The new payload unit start indicator created by controller 115 identifies, for example, the first byte of the CPSI section instead of the first byte of the corresponding PSI section.

Following step 230, the flowchart of FIG. 2 continues with step 237 of FIG. 3. Controller 115 determines, in step 237, whether broadcast encryption codes are conveyed in datastream fields other than the CPSI. Specifically, controller 115 determines whether broadcast encryption codes are conveyed in MPEG compatible adaptation fields of packet headers (per MPEG systems standard syntax section 2.4.3.4). If so, controller 115 performs step 249 to create a composite datastream that comprises CPSI packets and program content packets with null data substituted for the broadcast encryption codes in the packet headers. The encryption code substitution is performed on a packet by packet basis at packet frequency.

In step 249, the substitution packet data pre-loaded during step 215 (FIG. 2) into the substitution buffer in unit 60 is provided from unit 60 to mux 110 (FIG. 1) under control of controller 115. In addition, in step 249, the CPSI in the form of packetized MPEG compatible section data formed in step 230 is provided by controller 115 to mux 110 (FIG. 1). Program content packet datastreams from unit 47 or unit 50 as previously discussed in connection with step 215, are also provided to mux 110. In step 249, controller 115 multiplexes between the program content datastream, the CPSI datastream, and the substitution data input to mux 110 using path select signal C to create a composite datastream that is output by mux 110 to storage interface 95. The composite datastream comprises program content packets and CPSI packets with null data substituted for the broadcast encryption codes in the packet headers.

Controller 115 synchronizes insertion of the CPSI packets and null data into the program datastream to be stored, in response to a PSI interrupt signal and a substitution timing signal from control unit 65 (FIG. 1). The PSI interrupt indicates the presence of PSI packets in buffer 60 as discussed in connection with step 205. The substitution timing signal synchronizes insertion of null data with the occurrence of the broadcast encryption codes in packet headers. In this manner, the packetized sections of the CPSI are inserted into PSI locations to replace the corresponding sections of the PSI and the broadcast encryption codes are removed. The non-encrypted CPSI data is insertable in either the encrypted or non-encrypted program content datastreams that are input to mux 110 in order to create either encrypted or non-encrypted programs for storage.

It should be noted that the broadcast encryption code substitution performed in step 249 may also be applied to codes conveyed in datastream fields other than the MPEG packet header adaptation fields. Further, the encryption codes may be replaced at intervals other than those at which the adaptation fields occur. For example, null data may be substituted for encryption codes occurring in a variety of MPEG and non-MPEG compatible datastream locations including: auxiliary packets within the proprietary Digital Satellite System (DSS™); Packetized Elementary Stream (PES) fields (per MPEG systems standard syntax sections 2.5.3.7–2.5.4.2); Digital Storage Media Control Commands (DSMCC) fields (per MPEG systems standard syntax Appendix A); and non-MPEG packets formatted according to other data transmission protocols such as the standardized CEBus control protocol (Home Automation Standard (CEBus), EIA/IS-60, December 1989).

If the encryption codes are conveyed in packets in which the codes themselves are the only data items of consequence, the code carrying packets may be omitted entirely from the output datastream. This may be accomplished by discarding the packets via PID selection units 45 and 47 (FIG. 1) or by omitting the packets during the multiplexing operation performed in step 249. However, data rate and data structure sensitive parameters within the output datastream syntax may need to be updated to reflect the data rate change occurring as a result of such packet data omission.

In step 249, store interface 95 (FIG. 1) receives the programs to be stored in the form of the packetized datastream (hereinafter termed the CPSI stream) incorporating the CPSI and null data from mux 110. In step 254 (FIG. 3), following step 249, the conditional access system within system 25 bills the User for the program storage (or communication to other devices). The User is billed by storing billing information within the insertable smart card itself. The storage of the billing information is initiated by the application of the playback algorithm but billing need not be contemporaneous with application of the algorithm. The billing information indicates that the User has stored an encrypted broadcast program. This billing information is later accessed via telephone link by the service provider and used to bill the User via a conventional billing process. Other billing mechanisms are equally possible. For example, credits may be deducted from a pre-stored credit sum within a smart card. Further, the smart card may vary billing amount based on the type of storage requested e.g. there may be one fee for storage permitting only a single copy or playback of the stored program and another fee for storage permitting unlimited copying or playback of the program. The type of storage requested is encoded within designated copy protection data in the CPSI stream itself or in packet data external to the CPSI stream. The process of FIGS. 2–3 used by controller 115 to generate a program datastream (the CPSI stream) suitable for storage on medium 105 and to bill a user for the storage terminates at step 258.

If controller 115 determines, in step 237, that no broadcast encryption codes are conveyed in MPEG compatible adaptation fields of packet headers, controller 115 performs steps 240–245. These steps mirror steps 249–258 except that because there are no broadcast encryption codes present in the datastreams input to mux 110 representing the program to be stored, there is no need for insertion of null data. Otherwise, controller 115 performs step 240 to create the CPSI stream for storage via store interface 95 and performs step 244 to bill the user for storage in similar fashion to that described in connection with steps 249 and 254. This branch of the process of FIGS. 2–3 terminates at step 245. However, it should be noted that the CPSI stream may alternatively be provided to other applications in steps 240 and 249 such as display or communication via interface 70 instead of storage via interface 95.

The CPSI stream from mux 110 is buffered by interface 95 to reduce gaps and bit rate variation in the data. The resultant buffered data is processed by storage device 90 to be suitable for storage on medium 105. Controller 115 initiates and controls the operation of storage device 90 (FIG. 1) by command via I/O port 100 using a standardized CEBus control protocol (e.g. Home Automation Standard (CEBus), EIA/IS-60, December 1989). Storage device 90 is a linear storage medium DVHS™ type device and medium 105 is a linear sequential access type medium such as video tape, for example. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the CPSI on tape medium 105.

Although described as a DVHS™ device that stores data on a linear type storage medium in the exemplary embodiment of FIG. 1, storage unit 90 may be any type of storage unit. For example, unit 90 may be a solid state or nonlinear type device for storing data in RAM or on a nonlinear medium. A nonlinear type medium is a medium that accommodates non-sequential access such as a disc medium including CDROM or DVD, for example. If unit 90 and medium 105 are nonlinear or solid state type storage systems, unit 90 separates the CPSI data from the CPSI stream and stores the CPSI data in a designated directory section of the medium. This advantageously avoids repeated storage of the CPSI and reduces the required storage capacity. Alternatively, unit 90 may store the CPSI stream as formed and input to unit 90, incorporating one or more repetitions of the CPSI data.

Further, system 25 of FIG. 1 may incorporate a plurality of storage/retrieval paths that support the operation of a plurality of storage devices of various types including linear, nonlinear and solid state types. The single storage/retrieval path shown in FIG. 1 comprises units 47, 90, 95, 105 and 110, as described. By replicating these elements to create parallel storage functions, system 25 is readily extended to incorporate a plurality of storage paths. The storage path and programs destined for a particular storage device are selected by user generated data (SP, SM) input to controller 115 via interface 120 following on-screen menu selection with remote control unit 125, as previously described.

System 25 of FIG. 1 recovers programs from storage device 90 and medium 105 in a playback mode using the process of FIG. 4. The recovered datastreams are processed by system 25 and provided to application devices 75, 80 and 85 for display or output, for example. Alternatively, the program datastreams may be stored on other parallel storage devices (not shown in FIG. 1 to simplify the drawing).

In step 505 of FIG. 4, following the start at step 500, user generated data (SR, SM) is input to controller 115 of system 25 (FIG. 1) identifying the programs (SR) to be recovered and the storage device (SM) from which the programs are to be recovered. The user selection data is input to controller 115 via interface 120 following on-screen menu selection with remote control unit 125. It is assumed for exemplary purposes that the user selects programs to be recovered from storage device 90 (FIG. 1).

Controller 115, in step 510, initiates recovery of the selected program datastreams by device 90 from medium 105 by command via I/O port 100 using the standardized CEBus control protocol as previously discussed. Device 90 decodes the error encoded data retrieved from medium 105 to recover the corresponding data originally provided to device 90 for storage. Device 90 may be a DVHS™ linear type storage unit or another type of storage unit such as a solid state RAM or nonlinear type DVD or CDROM type device. The recovered decoded datastreams are transferred, in step 510, by device 90 to interface 95. This data transfer is controlled and synchronized by controller 115 via the standard CEBus. Interface 95, buffers the data received from unit 90 to adjust the time intervals between data packets to provide a buffered data output that is MPEG compatible and complies with MPEG bit rate constraints.

In step 515, controller 115 directs the buffered output from interface 95 (the playback datastream) via mux 37 to PID selection units 45 and 47 using path select signal C. In step 515, controller 115 determines whether single copy or unlimited copy limitations that were encoded in the designated copy protection data in steps 244 and 254 (FIG. 3), are being exceeded by the recovered program. Subject to recovery being permitted, controller 115, in step 515 (FIG. 4), recovers the playback encryption code that was generated in step 227 (FIG. 2) from the CAT for the selected programs (SR) and provides the code to smart card unit 130 in the manner previously described in connection with step 215 (FIG. 2). Under control of controller 115, smart card 130, in step 515 (FIG. 4), applies the playback algorithm to generate the original broadcast encryption keys from the playback encryption code. The broadcast encryption keys are provided to the PID, destination and encryption key look-up tables in units 45 and 47 by controller 115 in step 515.

In step 520, units 45 and 47 and the remaining units of system 25 process the playback datastream either for storage via mux 110 or for application use via interface 70. Both the playback datastream from unit 95 and the transmitted datastream from selector 35, following selection via mux 37, are processed by system 25 in a similar manner. Both these datastreams are processed in the way previously described for the transmitted datastream except for the encryption key generation steps and for the CPSI processing steps. In playback mode, smart card 130 applies a playback encryption key generation algorithm instead of a broadcast key generation algorithm. Smart card unit 130 applies the playback algorithm function to decrypt the encryption codes previously encoded with the playback encoding algorithm in step 227 of FIG. 2. Thereby, unit 130 derives the original broadcast encryption keys for the program selected for playback (SR). The broadcast encryption keys are used by DES decryption unit 50 to decrypt the encrypted program content packets in subsequent step 520 (FIG. 4) in the manner previously described for the transmitted datastream. However, the playback datastream selected via mux 37 already incorporates the CPSI. Therefore, in the playback mode, controller 115 in step 520, does not perform the steps related to CPSI formation described in connection with FIGS. 2–3.

In the exemplary playback mode shown in FIG. 4, system 25 in step 520, transport decodes the playback datastream to provide decoded data to application decoders 80 and 85, for display. In this mode, system 25 applies the latest complete CPSI data contained in the playback datastream, in accordance with the MPEG standard, to provide a transport decoded datastream representing selected program SR.

The CPSI is applied in transport decoding the playback datastream using PID filters 45 and 47, decryptor 50, decoder 55, buffer 60 and control unit 65 in a manner similar to that previously described in connection with FIG. 1. The transport decoded datastream, excluding the CPSI, is provided, via interface 70, to application decoders 80 and 85 for MPEG decoding and image reproduction. In other modes, system 25 provides the playback datastream incorporating the CPSI to other application devices such as to high speed data port 75, for example. The CPSI is then available to be applied in transport decoding the playback datastream, as necessary, by these application devices or subsequent devices. If the playback datastream is to be stored to a second storage device other than device 90, for example, mux 110 provides the datastream, incorporating the CPSI, to the second storage device via a second storage interface. Further, the second storage device and interface (neither are shown in FIG. 1) mimic the operation and function of units 90 and 95 respectively. The data from interface 70, MPEG decoded by application decoders 80 and 85, is presented via audio and image reproduction devices in units 80 and 85 respectively.

In step 527 (FIG. 4), the conditional access system within system 25 bills the User for the program playback. The User is billed within the insertable smart card itself by storage of billing information upon the application of the playback algorithm. The billing information indicates that the User has recovered an encrypted broadcast program. This billing information is later accessed via telephone link by the service provider and used to bill the User via a conventional billing process. Other billing mechanisms, as previously described, may equally be used. The playback process of FIG. 4 terminates at step 530.

The architecture of FIG. 1 is not exclusive. Other architectures may be derived in accordance with the principles of the invention to accomplish the same objectives. Further, the functions of the elements of the FIG. 1 architecture and the process steps of FIG. 2–4 may be implemented in whole or in part within the programmed instructions of a microprocessor. In addition, the principles of the invention apply to any system using an MPEG or non-MPEG compatible electronic program guide for conveying any of the information described herein as being conveyed in MPEG PSI tables. The invention principles are not restricted to program guides or PSI conveyed in MPEG compatible PSI tables.

What is claimed is:

1. In a video decoder, a method for adaptively processing input encrypted program data with an associated encryption code to provide either an encrypted or a decrypted program output, comprising the steps of:

receiving mode selection information for selecting one of
(a) a decrypted program output mode and (b) an encrypted program output mode;
(a) in encrypted mode selected in response to said mode selection information:

exporting encrypted program data and an associated encryption code to an output port;
(b) in decrypted mode selected in response to said mode selection information:

decrypting said input encrypted program data using an encryption key derived from said encryption code to provide decrypted program data; and exporting said decrypted program data to an output port.

2. A method according to claim 1, further including the step of decrypting said encryption code to provide said encryption key.

3. A method according to claim 2, wherein said decoder is a host device for receiving an insertable electronic device; and said step of decrypting said encryption code includes the step of using a decryption algorithm contained in said electronic device in decrypting said encryption code.

4. A method according to claim 2, wherein different decryption algorithms are used for decrypting said input encrypted program data and for decrypting said encryption code.

5. A method according to claim 1, wherein said mode selection information is conveyed in a datastream including said input encrypted program data.

6. A method according to claim 1, wherein said mode selection information comprises at least one of (a) information in an ancillary data field including a header data field, (b) information derived from program specific information including channel map, program map, network and conditional access information, (c) information pre-stored in said decoder, (d) user generated information, and (e) information derived from copy protection or use limitation information.

7. A method according to claim 1, wherein said mode selection information is provided by one of, (a) a service provider or broadcaster, and (b) a user of said decoder.

8. A method according to claim 1, further including the encrypted mode step of forming data into a datastream including said encrypted program data for limiting subsequent use of said encrypted program data by inhibiting subsequent decryption of said encrypted program data.

9. A method according to claim 8, wherein said encoding step further includes the step of including data into said datastream for limiting the number of subsequent copies that may be made of said encrypted program data.

10. A method for further processing said encrypted or decrypted program output according to claim 1, further including the step of storing data exported to said output port on a storage medium.

11. In a video decoder, a method for adaptively processing a plurality of programs including encrypted program data with an associated encryption code and non-encrypted program data, to provide either encrypted, non-encrypted or decrypted output program data, comprising the steps of:

receiving mode selection information for selecting one of (a) a decrypted program output mode and (b) an encrypted program output mode;

(a) in non-encrypted mode:

exporting non-encrypted program data to an output port;

(b) in encrypted mode selected in response to said mode selection information:

exporting encrypted program data to an output port;

(c) in decrypted mode selected in response to said mode selection information:

decrypting said encrypted program data using an encryption key derived from said encryption code to provide decrypted program data; and exporting said decrypted program data to an output port.

12. A method according to claim 11, further including the step of decrypting said encryption code to provide said encryption key.

13. A method according to claim 12, wherein said decoder is a host device for receiving an insertable electronic device; and said step of decrypting said encryption code includes the step of using a decryption algorithm contained in said electronic device in decrypting said encryption code.

14. A method according to claim 12, wherein in decrypting said encrypted program data and in decrypting said encryption code different decryption algorithms are used.

15. A method according to claim 11, wherein said mode selection information is conveyed in a datastream including said encrypted program data.

16. A method according to claim 11, wherein said mode selection information comprises at least one of, (a) information in an ancillary data field including a header data field, (b) information derived from program specific information including channel map, program map, network and conditional access information, (c) information pre-stored in said decoder, (d) user generated information, and (e) information derived from copy protection or use limitation information.

17. A method according to claim 11, wherein said mode selection information is provided by one of, (a) a service provider or broadcaster, and (b) a user of said decoder.

18. A method according to claim 11, further including the encrypted mode step of forming data into a datastream including said encrypted program data for limiting subsequent use of said encrypted program data by inhibiting subsequent decryption of said encrypted program data.

19. A method according to claim 18, wherein said encoding step further includes the step of including data into said datastream for limiting the number of subsequent copies that may be made of said encrypted program data.

20. A method for further processing said encrypted, non-encrypted or decrypted output program data, according to claim 11, further including the step of storing data exported to said output port on a storage medium.

* * * * *